Patented Oct. 2, 1945

2,385,855

UNITED STATES PATENT OFFICE 2,385,855

MANUFACTURE OF NEW COLORING MATTERS

Eric Paul Goodings and Maurice Arthur Thorold Rogers, Blackley, Manchester, England, assignors to Imperial Chemical Industries Limited, a corporation of Great Britain No Drawing. Application July 9, 1943, Serial No. 494,125. In Great Britain July 13, 1942

3 Claims. (Cl. 260—240)

This invention relates to the manufacture of new coloring matters.

According to the invention we provide a process for the manufacture of new coloring matters which comprises causing to interact a 2:4-diarylpyrrole of the formula

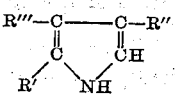

where R' and R" stand for aryl radicals, for example of the benzene or naphthalene series, substituted or not, the same or different, and where R''' stands for hydrogen or for a non-reactive substituent, for example an aryl-, alkyl-, alkylamino-, benzylideneamino- or acylamino-radical, with a diarylketone.

Suitable 2:4-diarylpyrroles of the above formula incdlude 2:4-diphenylpyrrole, 2-phenyl-4 - (p - methoxyphenyl)-pyrrole, 2-(p-methoxyphenyl) - 4-phenylpyrrole, 3-benzoylamino-2:4-diphenylpyrrole, 2 - phenyl-4-(o-chlorophenyl)-pyrrole, 2 - (p-acetylaminophenyl) - 4-phenylpyrrole, 2 - α - naphthyl - 4 - phenylpyrrole, 2-phenyl - 4-β-naphthylpyrrole, 2:3:4-triphenylpyrrole, 3-benzolamino-2:4-diphenylpyrrole, 3-benzoylamino-2:4-di-p-tolylpyrrole and 3-acetoacetylamino-2:4-diphenylpyrrole. The preparation of certain of said 2:4-diphenylpyrroles is described in copending application Serial No. 457,229 filed September 3, 1942, in Serial No. 475,434 filed February 10, 1943, and in corresponding British Patent No. 556,156. Also included are the sulphonic acids of the 2:4-diarylpyrroles which may be made, for example, by sulphonating the above compounds. The preparation of such sulfonic acids is described in our copending application Serial No. 482,479 filed April 9, 1943.

Suitable diarylketones include Michler's ketone, 4:4' - bis - (diethylamino) - benzophenone, 4-chloro-4' - dimethylamino-benzophenone. The ketones may be used in the form of their simple functional derivatives, for example in the form of an oxime or an anil.

The formation of the new coloring matters may be represented, in equation form, as follows, it being noted that the 2:4-diarylpyrrole may, by tautomeric interchange, have either the Formula A or B:

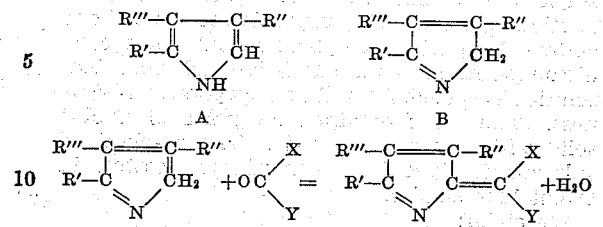

where R', R" and R''' have the significance given above, and where

is a diaryl ketone in which X and Y are aryl radicals, the same or different, substituted or not.

In carrying the process of the invention into effect the reactants are usually heated together, advantageously dissolved in a mutual solvent, and in the presence of a strongly acidic condensing agent, for example, phosphorus oxychloride, sulphuric acid, hydrogen chloride or acetic acid. The reaction mixture may then be made basic if desired after removal of the solvent and the product may be isolated and purified by conventional methods.

The new coloring matters are blue in color, and may be used as pigments or for other coloring purposes. In the form of water-soluble derivatives, for example salts, or sulphonic acids or salts of these, the new coloring matters may be used for dyeing.

Water-soluble derivatives may be obtained by forming salts of those of the coloring matters which are sufficiently basic for example with sulphamic acid, by forming quaternary ammonium salts (when quaternary salt-forming groups are present) or by sulphonation of the coloring matters to yield sulphonic acid derivatives which are in themselves, or in the form of their salts, soluble in water. Alternatively, water-soluble derivatives may be obtained by using as one or both of the ingredients a compound containing already one or more water-solubilising groups, for example, sulphonic acid groups.

The invention is illustrated but not limited by the following example, in which the parts are expressed by weight:

*Example*

5.36 parts of Michler's ketone, 4.38 parts of 2:4-diphenylpyrrole and 75 parts of dry toluene are heated to 60° C. until the solids are dissolved. This is solution A. 3.7 parts of phosphorus oxychloride are dissolved in 20 parts of toluene. This is solution B. Solution A is stirred and kept at 60° C. by external heating and solution B is added during 15 minutes. The mixture is then heated to 100° C. and kept at this temperature during 4 hours. The product is then subjected to steam distillation whereby the toluene is removed and the residue which consists of an oil and an aqueous liquid is separated. The oil is dissolved in 100 parts of methanol and 8 parts of a 33% aqueous solution of sodium hydroxide are added. A reddish-brown precipitate is formed which is filtered off, washed with water and dried. This product may be purified, if desired, by recrystillisation from benzene. It is insoluble in water.

The product is converted into its water-soluble sulphamate by suspending 4.69 parts in 60 parts of ethanol, heating the suspension to the boil and adding 0.5 part of sulphamic acid. The solid dissolves forming an intensely blue solution. The solution is cooled, filtered and evaporated to dryness. There are obtained 5.1 parts of a blue solid with a coppery glance. The so-obtained sulphamate dyes tannin-mordanted cotton in bright blue shades.

We claim:

1. Coloring matters of the formula:

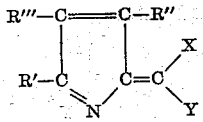

where R' and R" stand for aryl radicals, R''' is a member of the group consisting of hydrogen, aryl-, alkyl-, alkylamino-, benzylideneamino-, and acylamino-radicals and

stands for the residue of a diarylketone containing a dialkylamino group in the 4-position to the CO group of the formula

wherein X and Y are aryl radicals containing a dialkylamino radical.

2. Process for the manufacture of new coloring matters which comprises causing to interact a 2:4-diarylpyrrole of the formula

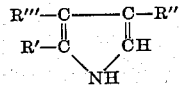

where R', R" and R''' have the significance given in claim 1 above, with a diaryl ketone containing a dialkylamino group in the 4-position to the CO group.

3. Coloring matters of the formula

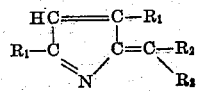

wherein $R_1$ is a benzene nucleus and $R_2$ is an aryl radical.

ERIC PAUL GOODINGS.
MAURICE ARTHUR THOROLD ROGERS.